(12) United States Patent
Posa

(10) Patent No.: US 11,965,600 B2
(45) Date of Patent: Apr. 23, 2024

(54) MECHANICAL SEALING ARRANGEMENT AND A SENSOR RING FOR MONITORING THE OPERATION OF A MECHANICAL SEAL ARRANGEMENT

(71) Applicant: Sulzer Management AG, Winterthur (CH)

(72) Inventor: Atte Posa, Kotka (FI)

(73) Assignee: SULZER MANAGEMENT AG, Winterthur (CH)

( * ) Notice: Subject to any disclaimer, the term of this patent is extended or adjusted under 35 U.S.C. 154(b) by 142 days.

(21) Appl. No.: 17/312,568

(22) PCT Filed: Dec. 11, 2019

(86) PCT No.: PCT/EP2019/084664
§ 371 (c)(1),
(2) Date: Jun. 10, 2021

(87) PCT Pub. No.: WO2020/141048
PCT Pub. Date: Jul. 9, 2020

(65) Prior Publication Data
US 2021/0324957 A1   Oct. 21, 2021

(30) Foreign Application Priority Data

Jan. 4, 2019  (EP) ..................... 19150289

(51) Int. Cl.
*F16J 15/34*   (2006.01)
(52) U.S. Cl.
CPC ................. *F16J 15/3492* (2013.01)
(58) Field of Classification Search
CPC .................................... F16J 15/3492
See application file for complete search history.

(56) References Cited

U.S. PATENT DOCUMENTS

| | | | | |
|---|---|---|---|---|
| 5,345,829 | A | * | 9/1994 | Yamauchi ............ F16J 15/3492 277/358 |
| 5,448,924 | A | * | 9/1995 | Nagai .................. F16J 15/3492 277/358 |

(Continued)

FOREIGN PATENT DOCUMENTS

| CN | 107100999 B | 7/2018 |
|---|---|---|
| EP | 2 362 122 B1 | 8/2011 |

(Continued)

OTHER PUBLICATIONS

International Search Report and Written Opinion issued Jan. 28, 2020 in corresponding International Patent Application No. PCT/EP2019/084664 filed Dec. 11, 2019.

(Continued)

*Primary Examiner* — Gilbert Y Lee
(74) *Attorney, Agent, or Firm* — GLOBAL IP COUNSELORS, LLP

(57) ABSTRACT

A mechanical sealing arrangement includes a rotary part, a non-rotary part and a signal processing arrangement. The rotary part includes at least a rotary slide ring and a rotary slide ring carrier, the non-rotary part including at least a non-rotary slide ring and a non-rotary slide ring carrier, and the signal processing arrangement includes at least one sensor for monitoring the operation of the mechanical sealing arrangement. A sensor ring is disposed on the non-rotary slide ring carrier, the sensor ring includes the at least one sensor and a device for transmitting measurement data from the at least one sensor for further processing.

11 Claims, 3 Drawing Sheets

(56) References Cited

U.S. PATENT DOCUMENTS

| | | | |
|---|---|---|---|
| 6,065,345 A | 5/2000 | Holenstein et al. | |
| 6,360,610 B1 | 3/2002 | Jarzynski et al. | |
| 8,527,214 B2 | 9/2013 | Horak | |
| 2005/0016303 A1* | 1/2005 | Jacobs | F16J 15/3492 73/49.8 |
| 2009/0290971 A1* | 11/2009 | Shamseldin | F04D 29/124 415/118 |
| 2010/0106429 A1* | 4/2010 | Horak | F16J 15/3492 702/34 |
| 2018/0038488 A1 | 2/2018 | Matheidas et al. | |
| 2022/0260159 A1* | 8/2022 | Päivinen | G01M 3/04 |

FOREIGN PATENT DOCUMENTS

| | | |
|---|---|---|
| GB | 2395532 A | 5/2004 |
| GB | 2430034 A | 3/2007 |
| JP | 2015-161379 A | 9/2015 |
| WO | 2018/210504 A1 | 11/2018 |
| WO | 2020249316 A1 | 12/2020 |
| WO | 2021033382 A1 | 2/2021 |

OTHER PUBLICATIONS

International Preliminary Report on Patentability issued May 20, 2021 in corresponding International Patent Application No. PCT/EP2019/084664 filed Dec. 11, 2019.

\* cited by examiner

MECHANICAL SEALING ARRANGEMENT AND A SENSOR RING FOR MONITORING THE OPERATION OF A MECHANICAL SEAL ARRANGEMENT

CROSS-REFERENCE TO RELATED APPLICATIONS

This application is a U.S. National Stage application of International Application No. PCT/EP2019/084664, filed Dec. 11, 2019, which claims priority to European Patent Application No. 19150289.7, filed Jan. 4, 2019, the contents of each of which are hereby incorporated herein by reference.

BACKGROUND

Field of the Invention

The present invention relates to a mechanical sealing arrangement and a sensor ring.

Background Information

Mechanical seals are gaining more and more acceptance in various shaft sealing applications. The mechanical seals can be found in various pumps, mixers and agitators. Conventional mechanical seals are of relatively simple construction, they endure high temperatures and their maintenance and service are relatively easy. But, just like all kinds of seals, their lifetime is hard to predict. It is also quite impossible to perform any visual monitoring of the condition of the seal. Therefore, prior art includes numerous documents that discuss the monitoring of the condition of a mechanical seal.

U.S. Pat. No. 6,065,345 discloses a method of monitoring the condition of a mechanical seal in an apparatus including a rotating part, in particular in a pump, which has a rotating shaft for the forwarding of a fluid. The sound emission of the seal is continually measured at discrete times in the operating state of the apparatus and at least one statistical characteristic value is gained from the acoustic signals. The goal in the above discussed patent is to monitor the sliding condition of the seal. In other words, if the seal is starting to run dry, i.e. the flushing is, for some reason, not working properly, the acoustic emission from the seal changes with the condition of the lubricating film. This US patent also discloses the effect of the speed of rotation of the pump, the temperature of the flushing liquid, the pressure of the fluid to be pumped, etc. on the acoustic emission of the seal, whereby the acoustic emission may change even if the sliding conditions were not changed.

U.S. Pat. No. B1-6,360,610 discloses a system and a method that are particularly suited for monitoring the interface of two liquid lubricated mechanical seal faces. The system monitors an interface by using a wave source to produce an ultrasonic shear wave, directing the wave at the interface, detecting the wave after it interacts with the interface, and comparing the detected wave to predetermined wave characteristics. Based on the comparison, an alarm may be triggered. The alarm can indicate that the mechanical seal is failing. In a preferred example, the approach involves detecting the collapse of the lubricating film between the seal faces and detecting excessive asperity contact. The collapse of the lubricating film and excessive asperity contact are precursors to seal failure. An ultrasonic transducer is placed behind one of the seal faces and used to produce ultrasonic shear waves (at a known frequency and amplitude) which propagate toward the interface between the two seal faces. By monitoring the amplitudes of the waves transmitted through or reflected by the interface, one can detect film collapse and the degree of contact between the faces.

Yet another document disclosing the condition of the fluid film between the slide surfaces is GB-A-2430034. This reference discloses a condition monitoring system, using at least one acoustic emission sensory device to indirectly and/or remotely monitor the health status of a piece of rotating equipment, and applications thereof as for example a mechanical seal or a bearing assembly. The acoustic emission sensory device can be placed in direct or indirect contact to counter rotating surfaces. The signal emitted by the acoustic emission sensory device can be amplified, filtered for background noise, computed, compared to reference values and stored on a data storage device.

U.S. Pat. No. B2-8,527,214 discusses a mechanical device showing the degree of wear of the slide surfaces of the mechanical seal. The discussed mechanical device is, on the one hand, a simple device measuring the physical axial movement of a slide ring due to wear, but, on the other hand, in most applications it is, in practice, quite hard to arrange such in connection with a mechanical seal. Especially, it would also be difficult to arrange a follower to be in mechanical contact with the rotary slide ring carrier the axial movement of which is to be measured, as instructed in the patent.

In other words, the above cited prior art discusses either abnormal operating conditions in which the lubrication of the mechanical seal surfaces has failed or is about to fail resulting in dry running of the seal, or wear in normal operating conditions. However, the monitoring of dry running or wear in normal operating conditions, requires, in accordance with prior art such an arrangement that is, though in principle simple, hard to construct and includes a great risk of functional failure, as the follower discussed in the cited patent (U.S. Pat. No. B2-8,527,214) is apt to wear, too.

In addition to the above discussed prior art documents, EP-B1-2362122 needs to be mentioned. The EP reference lists a number of sensors to be arranged in or on the mechanical seal, preferably in or close to the sealing gap between the rotary and non-rotary sealing surfaces. The EP reference lists the following operating parameters that may be followed: pressure of the working fluid close to the seal, temperature of the working fluid, temperature at the sealing gap, leakage flow through the sealing gap, rotational speed of the shaft and/or vibration of the seal arrangement. However, the document does not discuss the way the various sensors are arranged in connection or in communication with the mechanical seal.

Document WO2018210504 A1 discloses a mechanical sealing which includes a sensor arranged to a slide ring carrier of a non-rotary part of the sealing.

Document GB2395532 A discloses a mechanical sealing device which includes one or more sensors which monitor any force, torque or vibration transmitted from the sealing area to the spring plate via the stationary seal face 31.

Document CN 10710099 B discloses an immersion oil centrifugal sealing device. This device has an axial sealing ring arranged against a rotating shaft, which has an inner circumferential groove in which a distance detection sensor is arranged to measure the gap between the axial seal ring and the outer peripheral surface of the rotating shaft.

In almost all prior art cases the condition of the seal is monitored more or less by external sensors, which is quite understandable as the access to the mechanical seal is not easy and no simple means of monitoring the seal condition has not been available on the market.

SUMMARY

An object of the invention is to provide a mechanical sealing arrangement and a sensor which improve the performance of a mechanical sealing considerably compared to the prior art solutions.

At least one of the objects of the present invention is met substantially as disclosed herein and in the other details of different embodiments of the invention.

According to an embodiment of the present invention the mechanical sealing arrangement has a rotary part, a non-rotary part and a signal processing arrangement, the rotary part comprising at least a rotary slide ring and a rotary slide ring carrier, the non-rotary part comprising at least a non-rotary slide ring and a non-rotary slide ring carrier, and the signal processing arrangement comprising at least one sensor for monitoring the operation of the mechanical sealing arrangement. The mechanical sealing arrangement comprises a sensor ring disposed on the non-rotary slide ring carrier, the sensor ring including the at least one sensor and a device for transmitting measurement data from the at least one sensor for further processing, the sensor ring having a first wall and a second wall leaving a cavity therebetween, wherein the cavity is opening in a radially inward direction, wherein at least one opening is arranged in the second wall through which the at least one sensor is arranged to extend from the cavity to outside the sensor ring.

According to an embodiment of the invention the mechanical sealing comprises at least one opening in the non-rotary slide ring carrier for the at least one sensor.

According to an embodiment of the invention the opening in the second wall of the sensor ring and the opening in the non-rotary slide ring carrier are coaxial with each other and are together extending from the cavity to the non-rotary slide ring to bring the at least one sensor in contact with the non-rotary slide ring. This way a direct measurement from the slide ring is obtained.

According to an embodiment of the invention the at least one sensor is a temperature or vibration sensor.

According to an embodiment of the invention the sensor ring comprises at least one opening at its first wall for at least one sensor.

According to an embodiment of the invention the at least one sensor being a pressure sensor.

According to an embodiment of the invention the cavity in the sensor ring is an annular cavity in the inner circumference of the sensor ring.

According to an embodiment of the invention the cavity in the sensor ring is at least one groove arranged in the inner circumference of the sensor ring. The groove extends only partially around the inner circumference of the sensor ring to at least one direction from or passing by the at least one opening arranged in the second wall of the sensor ring.

According to an embodiment of the invention the sensor ring is sealed to the non-rotary slide ring carrier by at least one O-ring and at least one annular plane seal.

According to an embodiment of the invention the sensor ring is fastened to the non-rotary slide ring carrier by screws.

According to an embodiment of the invention a signal processing unit (SPU) receives the measurement data from the at least one sensor via a transmitting element.

A sensor ring according to the invention can monitor the operation of a mechanical seal arrangement. The sensor ring comprises a first wall and a second wall and a cavity therebetween, the cavity opening in radially inward direction, at least one of the first wall and the second wall comprising at least one opening for at least one sensor.

According to an embodiment of the invention the sensor ring has a first wall and a second wall leaving a cavity therebetween, wherein the cavity is an opening in a radially inward direction, and wherein at least one opening is arranged in the second wall through which the at least one sensor is arrangeable to extend from the cavity to outside the sensor ring when installed for use.

According to an embodiment of the invention the cavity in the sensor ring is an annular cavity in the inner circumference of the sensor ring.

According to an embodiment of the invention the cavity in the sensor ring is at least one groove arranged in the inner circumference of the sensor ring.

According to an embodiment of the invention transmitted data is measured by the at least one sensor for further processing.

According to an embodiment of the invention the transmitting device is one of a wiring, a fiber optic cable, an RF-connection and a Bluetooth connection.

By embodiments of the present invention the reliability and or predictability of the mechanical sealing arrangement is considerably improved.

Additionally, or alternatively a mechanical seal according to embodiments of the invention can include a reliable and simple structure to monitor the working of the mechanical seal in normal operating conditions.

Further the invention introduces a simple "sensor ring" that can be arranged in connection with all types of mechanical seals, including both single acting and double acting mechanical seals.

The exemplary embodiments of the invention presented in this patent application are not to be interpreted to pose limitations to the applicability of the appended claims. The verb "to comprise" is used in this patent application as an open limitation that does not exclude the existence of also non-recited features. The features recited in the dependent claims are mutually freely combinable unless otherwise explicitly stated. The novel features which are considered as characteristic of embodiments of the invention are set forth herein.

BRIEF DESCRIPTION OF DRAWINGS

The invention will be explained in more detail hereinafter with reference to the drawings.

DETAILED DESCRIPTION

Figure 1:
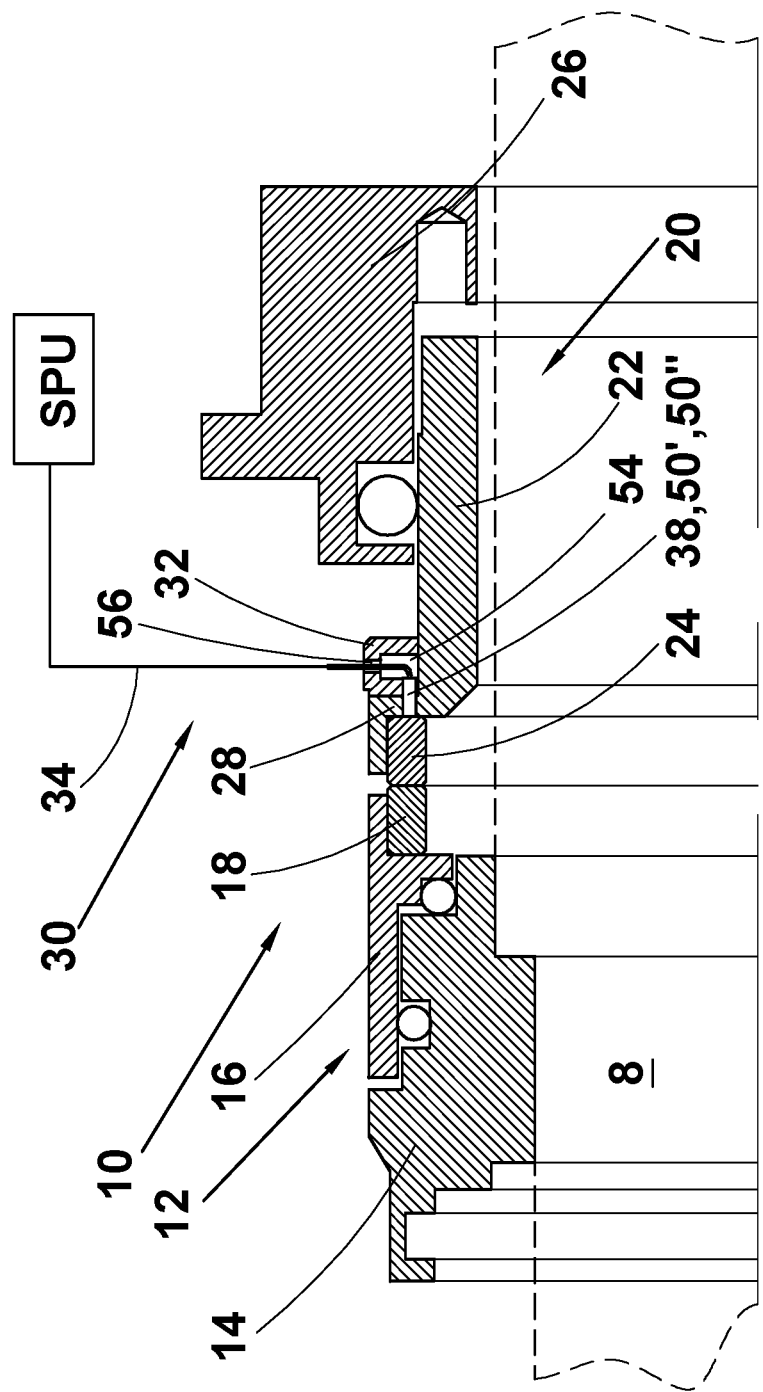
FIG. 1 illustrates a partial axial cross section of a mechanical seal arrangement in accordance with a preferred embodiment of the present invention.

FIG. 1 depicts a mechanical seal arrangement in accordance with a preferred embodiment of the present invention, the seal arrangement comprising a schematically and exemplarily illustrated single-acting mechanical seal 10 and a signal processing arrangement 30. The embodiments described herein are, naturally, applicable to double-acting mechanical seals, too. The mechanical seal 10 is used for sealing the shaft 8 (shown by dashed lines) of, for instance, a flow machine such that the interior of the flow machine, at the left hand side of the seal 10, is kept separate from the atmosphere, at the right hand side of the seal 10. The mechanical seal 10 is positioned in a seal chamber disposed within a specific seal housing or within a casing cover of a flow machine.

The mechanical seal 10 comprises a rotary part 12 and a non-rotary part 20. The rotary part 12 comprises a retainer ring 14, a rotary slide ring carrier 16 and a rotary slide ring 18. The rotary slide ring 18 is attached to an axial end of the rotary slide ring carrier 16. The non-rotary part 20 comprises a non-rotary slide ring carrier 22, a non-rotary slide ring 24 and a gland ring 26. The non-rotary slide ring 24 is attached to an end of the non-rotary slide ring carrier 22. The slide rings 18 and 24 are, when in use in the flow machine, in mechanical contact with one another. In addition to the shown components the mechanical seal can comprise O-rings, drive pins, set screws and bolts, but as they do not form a part of the present invention they have not been discussed in any more detail.

The signal processing arrangement 30 comprises a signal processing unit SPU, a sensor ring 32 with sensors 38 provided in connection therewith and a means or element 34 for transmitting data measured by the sensors 38 to the signal processing unit SPU. The sensor ring 32 is a separate ring element arranged on the non-rotary part 20 of the mechanical seal. The sensor ring has no essential direct function in operation of the mechanical seal itself, and its function relates to holding sensors suitably for obtaining accurate measurements and for holding the transmitting element 34. The transmitting element 34 can be a traditional wiring, a fiber optic cable or wireless transmitting device like Bluetooth or radio frequency transmitting device, just to name a few optional devices without any intention to limit the invention to the listed alternatives.

The rotary part 12 of the mechanical seal 10 is assembled on the shaft such that the retainer ring 14 is installed against a shoulder on the shaft 8, normally between the shoulder and, for instance, the hub of a centrifugal impeller, and the rotary slide ring carrier 16 with the rotary slide ring 18 fastened to the end thereof is pushed on O-rings disposed on the retainer ring 14.

Figure 2:
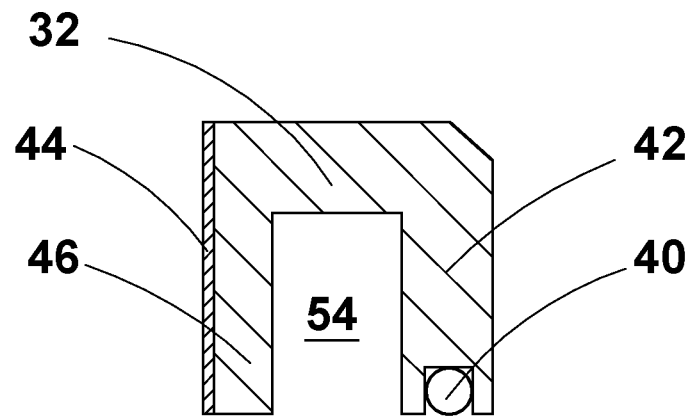
FIG. 2 illustrates a cross section of the sensor ring with a sealing element.

The non-rotary part 20 of the mechanical seal is assembled such that a sensor ring 32 is first pushed on the non-rotary slide ring carrier 22 against a radially outwardly extending flange-like part 28 of the non-rotary slide ring carrier 22. The sensor ring 32 can be fastened either in an axial direction to the flange like part 28 or in radial direction to the cylindrical part of the slide ring carrier 22. The sensor ring 32 includes a radial seal 40 and an axial sea 44, and it is assembled in a sealed manner on the non-rotary slide ring carrier 22, as illustrated in FIG. 2. The sensor ring 32 is sealed in a radial direction to the cylindrical part of the slide ring carrier 22 by at least one O-ring 40 disposed at the inner circumference of the first wall 42 of the sensor ring 32 and in the axial direction to the flange-like part 28, preferably but not necessarily, by an annular plane seal 44 disposed on the outer surface of the second wall 46 of the sensor ring 32. Thereafter the non-rotary slide ring carrier 22 is coupled, preferably in a non-rotary but, preferably but not necessarily, axially movable manner (possibly with the help of drive pins to keep the slide ring carrier 22 non-rotary and springs to allow axial movement of the non-rotary slide ring) to the gland ring 26 and the gland ring 26 is pushed inside an opening in the casing of a flow machine and fastened thereto. Thus, the rotary slide ring 18 and the non-rotary slide ring 24 fastened at an end of the non-rotary slide ring carrier 22 are brought in mechanical contact with one another.

Figure 3:
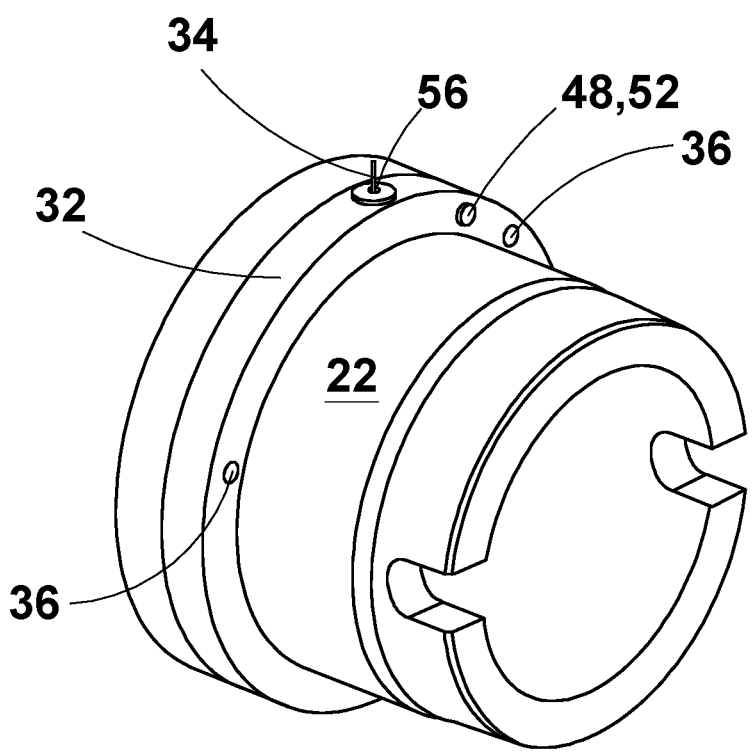
FIG. 3 illustrates an isometric view of the non-rotary slide ring carrier together with the sensor ring of the mechanical seal arrangement of FIG. 1.
Figure 4:
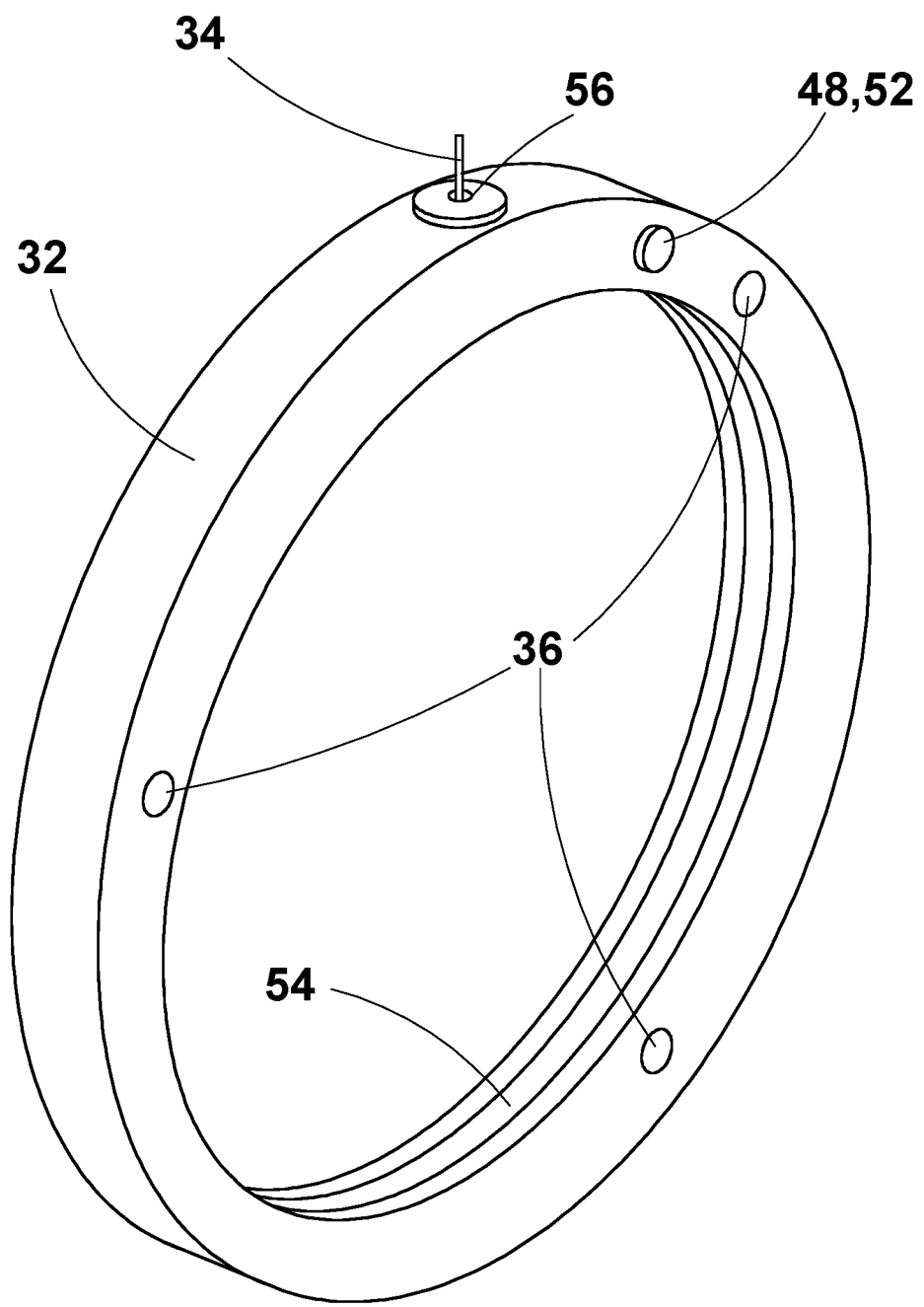
FIG. 4 illustrates an isometric view of the sensor ring of the present invention.

The sensor ring 32 illustrated, in addition to FIG. 1, also in FIGS. 2, 3 and 4, in this embodiment of the present invention, includes substantially axial holes 36 for fastening the sensor ring 32 to the flange-like part 28 of the non-rotary carrier ring 22, sensors 38, 48 required for watching at least one operating parameter of the mechanical seal and for monitoring the operation of the mechanical seal and a transmitting device 34 to transmit the data measured by the sensors 38, 48, i.e. a so called measurement data, to the signal processing unit SPU. Sensor 38 can be a temperature, acoustic or vibration sensor, just to name a few optional alternatives without, however, limiting the present invention to the named alternatives. The sensor ring comprises an opening 50' which is arranged through the second wall 46 of the sensor ring 32. There is also an opening 50" arranged through the flange-like part 28 of the non-rotary carrier ring 22 such that the sensor 38 can be brought through the opening 50' in the sensor ring 32 and the flange-like part 28 in the non-rotary carrier ring 22 can be in direct contact with the non-rotary slide ring 24. The openings are advantageously axial in respect to the carrier ring 22 and arranged coaxially with each other.

Sensor 48 in FIGS. 3 and 4 is a pressure sensor configured to record the fluid pressure in front of the mechanical seal 10. Thus, the sensor 48 is disposed in an opening 52 in the first wall 42 of the sensor ring 32. In addition to the pressure in the seal space also the temperature therein can be followed by device of the invention, just to name two optional alternatives without, however, limiting the present invention to the named alternatives only.

Preferably, the sensor ring 32 has a U-shaped cross section leaving between its first wall 42 and its second wall 46 an internal cavity 54 within the sensor ring 32 that opens, when in use, radially inwardly towards the non-rotary slide ring carrier 22 so that the sensors 38 and 48, and especially the transmitting device, i.e. for instance a wiring thereof, can be arranged in the internal cavity 54 out of contact with the liquid surrounding the mechanical seal. The cavity 54 in the sensor ring can may be an annular cavity extending over the entire inner circumference of the sensor ring 32 or it can be formed of at least one groove machined or otherwise disposed in the inner circumference of the sensor ring 32 to extend from the sensors 38, 48 to an opening 56 provided to take the transmitting device 34 from the sensors out of the sensor ring 32. The opening 56 is arranged advantageously to extend radially through a bottom of the cavity 54. The transmitting device 34, when it is mechanical wiring, fiber optic cable or a set of wirings or cables, is preferably taken along a unitary channel to the signal processing unit SPU. The channel can be taken to the signal processing unit SPU through the gland ring 26 or through the bearing housing or the casing cover, i.e. through whichever machine element surrounding the mechanical seal.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above can be used in connection with another embodiment when such combination is technically feasible.

The invention claimed is:

1. A mechanical sealing arrangement, the mechanical sealing arrangement comprising:
   a rotary part;
   a non-rotary part; and
   a signal processing arrangement, the rotary part comprising at least a rotary slide ring and a rotary slide ring carrier, the non-rotary part comprising at least a non-rotary slide ring and a non-rotary slide ring carrier, and the signal processing arrangement comprising at least one sensor configured to monitor operation of the mechanical sealing arrangement, a sensor ring including the at least one sensor and a device configured to transmit measurement data from the at least one sensor to be further processed, and the sensor ring having a first wall and a second wall leaving a cavity therebetween, the cavity opening in a radially inward direction, and being formed from at least one groove arranged in the inner circumference of the sensor ring, the sensor ring arranged on the non-rotary slide ring carrier, and at least one of the first wall and the second wall comprising at least one axial opening for the at least one sensor.

2. The mechanical sealing arrangement as recited in claim 1, wherein at least one opening is arranged in the non-rotary slide ring carrier for the at least one sensor.

3. The mechanical sealing arrangement as recited in claim 1, wherein the first wall includes the at least one axial opening.

4. The mechanical sealing arrangement as recited in claim 3, wherein the at least one sensor is a pressure sensor.

5. The mechanical sealing arrangement as recited in claim 1, wherein the cavity in the sensor ring is an annular cavity in the inner circumference of the sensor ring.

6. The mechanical sealing arrangement as recited in claim 1, wherein the at least one groove is arranged in the inner circumference of the sensor ring.

7. The mechanical sealing arrangement as recited in claim 1, wherein the sensor ring is sealed to the non-rotary slide ring carrier by at least one O-ring and at least one annular plane seal.

8. The mechanical sealing arrangement as recited in claim 1, wherein a signal processing unit is configured to receive the measurement data from the at least one sensor via the device configured to transmit the measurement data.

9. The mechanical sealing arrangement as recited in claim 1, wherein at least one opening is arranged in the second wall through which the at least one sensor is arranged to extend from the cavity to outside the sensor ring.

10. The mechanical sealing arrangement as recited in claim 9, wherein at least one opening is arranged in the non-rotary slide ring carrier for the at least one sensor, and the at least one opening in the second wall of the sensor ring and the at least one opening in the non-rotary slide ring carrier are coaxial with each other and together extend from the cavity to the non-rotary slide ring to bring the at least one sensor in contact with the non-rotary slide ring.

11. The mechanical sealing arrangement as recited in claim 1, wherein the at least one groove in the inner circumference of the sensor ring extends from the at least one axial opening for the at least one sensor to an opening for the device configured to transmit measurement data from the at least one sensor to be further processed, the opening for the device arranged to extend radially through a bottom of the cavity.

* * * * *